US010497178B2

(12) United States Patent
Cho

(10) Patent No.: US 10,497,178 B2
(45) Date of Patent: *Dec. 3, 2019

(54) ELECTRONIC APPARATUS, CONTROL METHOD THEREOF, COMPUTER PROGRAM, AND COMPUTER-READABLE RECORDING MEDIUM

(71) Applicant: THINKWARE CORPORATION, Seongnam-si, Gyeonggi-do (KR)

(72) Inventor: Ho Hyung Cho, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/814,150

(22) Filed: Nov. 15, 2017

(65) Prior Publication Data
US 2018/0075662 A1 Mar. 15, 2018

Related U.S. Application Data

(63) Continuation of application No. 14/955,762, filed on Dec. 1, 2015, now Pat. No. 9,846,969.

(30) Foreign Application Priority Data

Dec. 1, 2014 (KR) .................. 10-2014-0170051
Mar. 16, 2015 (KR) .................. 10-2015-0035744

(51) Int. Cl.
| | | |
|---|---|---|
| *G06T 19/00* | (2011.01) | |
| *B60R 1/00* | (2006.01) | |
| *G06K 9/00* | (2006.01) | |
| *G06T 11/60* | (2006.01) | |

(52) U.S. Cl.
CPC .............. *G06T 19/006* (2013.01); *B60R 1/00* (2013.01); *G06K 9/00805* (2013.01); *G06K 9/00825* (2013.01); *G06T 11/60* (2013.01); *B60R 2300/306* (2013.01); *B60R 2300/307* (2013.01); *B60R 2300/60* (2013.01)

(58) Field of Classification Search
CPC ...... G06T 19/006; G06K 9/00825; B60R 1/00
USPC ........................................................ 345/633
See application file for complete search history.

(56) References Cited

U.S. PATENT DOCUMENTS

| 9,135,754 B2 | 9/2015 | Ng-Thow-Hing et al. |
| 9,904,287 B1 * | 2/2018 | Kuffner, Jr. .......... G05D 1/0061 |
| 10,134,279 B1 * | 11/2018 | Toyoda .................... G08G 1/16 |
| 2011/0205340 A1 * | 8/2011 | Garcia .................. G01S 7/4972 |
| | | 348/46 |
| 2012/0116819 A1 | 5/2012 | Hertenstein |

(Continued)

FOREIGN PATENT DOCUMENTS

| CN | 102145693 A | 8/2011 |
| CN | 102782725 A | 11/2012 |

(Continued)

*Primary Examiner* — Ryan R Yang
(74) *Attorney, Agent, or Firm* — Novick, Kim & Lee, PLLC; Sang Ho Lee

(57) ABSTRACT

Provided herein is a control method of an electronic apparatus. The control method of an electronic apparatus includes: detecting a crosswalk from an image data photographed in a camera during a period in which a vehicle is operated; generating an object indicating the detected crosswalk; and outputting the generated object through augmented reality.

16 Claims, 14 Drawing Sheets

(56) References Cited

U.S. PATENT DOCUMENTS

| | | | |
|---|---|---|---|
| 2013/0293582 A1 | 11/2013 | Ng-Thow-Hing et al. | |
| 2014/0253345 A1* | 9/2014 | Breed | G08G 1/096716 340/905 |
| 2014/0362195 A1* | 12/2014 | Ng-Thow-Hing | G06K 9/00791 348/51 |
| 2015/0123816 A1* | 5/2015 | Breed | G08G 1/162 340/905 |
| 2015/0350608 A1* | 12/2015 | Winter | G06K 9/00369 382/103 |
| 2016/0003636 A1* | 1/2016 | Ng-Thow-Hing | H04N 7/188 701/26 |
| 2016/0260326 A1* | 9/2016 | Ng-Thow-Hing | G02B 27/01 |
| 2016/0341558 A1* | 11/2016 | Lee | G01C 21/30 |

FOREIGN PATENT DOCUMENTS

| | | |
|---|---|---|
| CN | 202815590 U | 3/2013 |
| CN | 103105174 A | 5/2013 |
| JP | 2004-257979 A | 9/2004 |
| JP | 2011-86097 | 4/2011 |

* cited by examiner

ELECTRONIC APPARATUS, CONTROL METHOD THEREOF, COMPUTER PROGRAM, AND COMPUTER-READABLE RECORDING MEDIUM

CROSS-REFERENCE TO RELATED APPLICATION

This application is a continuation application of U.S. patent application Ser. No. 14/955,762 filed on Dec. 1, 2015, which claims the priority to Korean Patent Application Nos. 10-2014-0170051, filed on Dec. 1, 2014, and 10-2015-0035744, filed on Mar. 16, 2015, with the Korean Intellectual Property Office, the entire disclosures of which are incorporated herein by reference.

BACKGROUND OF THE INVENTION

1. Field of the Invention

The present invention relates to an electronic apparatus, a control method thereof, a computer program, and a computer-readable recording medium, and more particularly, to an electronic apparatus capable of performing driving related guidance on a user on augmented reality, a control method thereof, a computer program, and a computer-readable recording medium.

2. Description of the Related Art

It is most important to safely drive a vehicle and prevent a traffic accident at the time of driving the vehicle. To this end, various assist apparatuses performing an attitude control of the vehicle, a function control of components of the vehicle, and the like, and safety apparatuses such as a safety belt, an air bag, and the like, have been mounted in the vehicle.

In addition, recently, apparatuses such as a black box, and the like, positioned in the vehicle and storing a driving image of the vehicle and data transmitted from various sensors therein to find out a cause of an accident of the vehicle at the time of occurrence of the accident have been provided in the vehicle. Portable terminals such as a smart phone and a tablet personal computer (PC) in which a black box application, a navigation application, or the like, may be mounted have been used as the apparatuses for a vehicle as described above.

However, currently, utilization of the driving image is low in the apparatuses for a vehicle as described above. In more detail, currently, even though the driving image of the vehicle is obtained through a vision sensor such as a camera mounted in the vehicle, an electronic apparatus of the vehicle has simply displayed or transmitted the driving image or has generated only simple surrounding notification information such as whether or not the vehicle has departed from a lane, or the like.

In addition, a head-up display (HUD) or an augmented reality interface has also been suggested as an electronic apparatus of the vehicle that has newly emerged currently. However, in the HUD and the augmented reality interface, the driving image of the vehicle has been utilized to be simply displayed or generate the simple surrounding notification information.

SUMMARY

An object of the present invention is to provide an electronic apparatus capable of generating an object indicating a crosswalk in a situation such as a case in which a vehicle stops at an intersection while being driven on a road, or the like, and outputting the generating object through augmented reality, a control method thereof, a computer program, and a computer-readable recording medium.

According to an exemplary embodiment of the present invention, there is provided a control method of an electronic apparatus, including: detecting a crosswalk from an image data photographed in a camera during a period in which a vehicle is operated; generating an object indicating the detected crosswalk; and outputting the generated object through augmented reality.

The control method of an electronic apparatus may further include determining whether or not the vehicle is in a stopped state, wherein in the generating, a first object for allowing a driver to recognize that the crosswalk is positioned in front of the vehicle is generated when it is determined that the vehicle is in the stopped state.

The control method of an electronic apparatus may further include determining signal kind information using an image data of a signal region portion of a signal lamp in the image data, wherein in the generating, a first object for allowing a driver to recognize that the crosswalk is positioned in front of the vehicle is generated when the vehicle is maintained in a stopped state in a state in which the signal kind information is a stop signal, and a second object for warning the driver that the crosswalk is positioned in front of the vehicle is generated when the vehicle starts in the state in which the signal kind information is the stop signal.

The first and second objects may be distinguished from each other by different colors.

The first and second objects may be implemented in a form including an alpha channel related to transparency of a color, and the first and second objects may include transparent regions depending on the alpha channel.

The control method of an electronic apparatus may further include: determining whether or not a pedestrian is present on the crosswalk using the photographed image data; and generating an object indicating whether or not the pedestrian is present.

The control method of an electronic apparatus may further include performing a control so as not to perform front vehicle start guidance in the case in which a front vehicle of the vehicle starts in a state in which the pedestrian is present on the crosswalk.

The control method of an electronic apparatus may further include performing a control to perform guidance for warning a driver that the pedestrian is present on the crosswalk in the case in which the vehicle starts in a state in which the pedestrian is present on the crosswalk.

Expression positions of the first and second objects may be regions in which the crosswalk is positioned on the augmented reality.

The outputting may include: performing calibration on the camera to calculate camera parameters; generating a virtual 3D space for a photographed image of the camera on the basis of the camera parameters; and positioning the generated object on the virtual 3D space.

According to another exemplary embodiment of the present invention, there is provided an electronic apparatus including: a display unit displaying a screen; an object generating unit generating an object indicating a crosswalk when the crosswalk is detected from an image data photographed in a camera during a period in which a vehicle is operated; and a control unit controlling the display unit to output the generated object through augmented reality.

The control unit may determine whether or not the vehicle is in a stopped state, and control the object generating unit to generate a first object for allowing a driver to recognize that the crosswalk is positioned in front of the vehicle when it is determined that the vehicle is in the stopped state.

The control unit may determine signal kind information using an image data of a signal region portion of a signal lamp in the image data, and control the object generating unit to generate a first object for allowing a driver to recognize that the crosswalk is positioned in front of the vehicle when the vehicle is maintained in a stopped state in a state in which the signal kind information is a stop signal and generate a second object for warning the driver that the crosswalk is positioned in front of the vehicle when the vehicle starts in the state in which the signal kind information is the stop signal.

The first and second objects may be distinguished from each other by different colors.

The first and second objects may be implemented in a form including an alpha channel related to transparency of a color, and the first and second objects may include transparent regions depending on the alpha channel.

The control unit may determine whether or not a pedestrian is present on the crosswalk using the photographed image data, and control the object generating unit to generate an object indicating whether or not the pedestrian is present.

The control unit may perform a control so as not to perform front vehicle start guidance in the case in which a front vehicle of the vehicle starts in a state in which the pedestrian is present on the crosswalk.

The control unit may perform a control to perform guidance for warning a driver that the pedestrian is present on the crosswalk in the case in which the vehicle starts in a state in which the pedestrian is present on the crosswalk.

Expression positions of the first and second objects may be regions in which the crosswalk is positioned on the augmented reality.

The control unit may perform a control to perform calibration on the camera to calculate camera parameters, generate a virtual 3D space for a photographed image of the camera on the basis of the camera parameters, and position the generated object on the virtual 3D space.

According to still another exemplary embodiment of the present invention, there is provided a computer program stored in a recording medium coupled to an electronic apparatus to execute the following steps: detecting a crosswalk from an image data photographed in a camera during a period in which a vehicle is operated; generating an object indicating the detected crosswalk; and outputting the generated object through augmented reality.

According to yet still another exemplary embodiment of the present invention, there is provided a computer-readable recording medium in which a computer program for executing a control method of an electronic apparatus is stored, wherein the control method of an electronic apparatus includes: detecting a crosswalk from an image data photographed in a camera during a period in which a vehicle is operated; generating an object indicating the detected crosswalk; and outputting the generated object through augmented reality.

DETAILED DESCRIPTION

Figure 1:
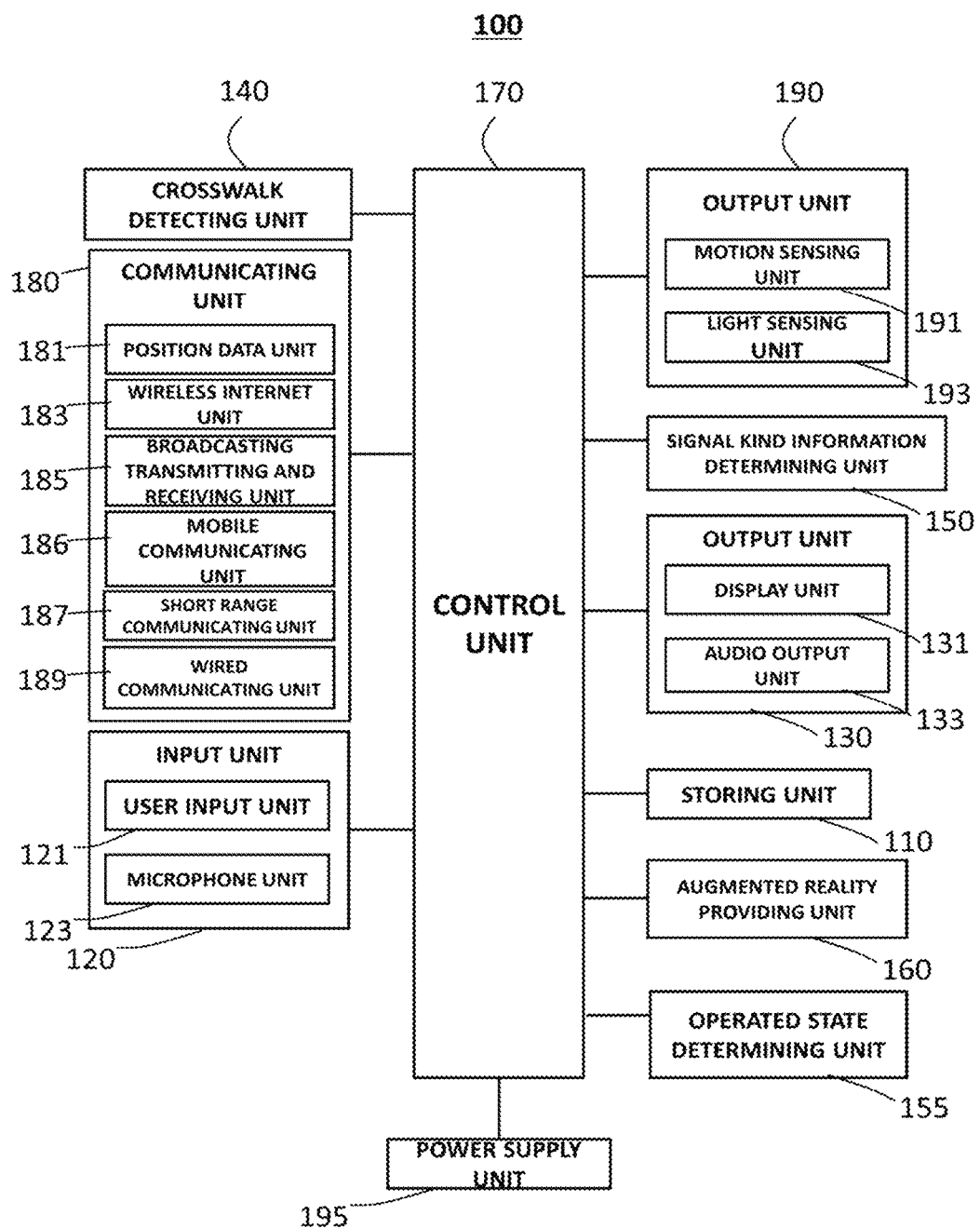
FIG. 1 is a block diagram illustrating an electronic apparatus according to an exemplary embodiment of the present invention.

The following description illustrates only a principle of the present invention. Therefore, those skilled in the art may implement the principle of the present invention and invent various apparatuses included in the spirit and scope of the present invention although not clearly described or illustrated in the present specification. In addition, it is to be understood that all conditional terms and exemplary embodiments mentioned in the present specification are obviously intended only to allow those skilled in the art to understand a concept of the present invention in principle, and the present invention is not limited to exemplary embodiments and states particularly mentioned as such.

Further, it is to be understood that all detailed descriptions mentioning specific exemplary embodiments of the present invention as well as principles, aspects, and exemplary embodiments of the present invention are intended to include structural and functional equivalences thereof. Further, it is to be understood that these equivalences include an equivalence that will be developed in the future as well as an equivalence that is currently well-known, that is, all devices invented so as to perform the same function regardless of a structure.

Therefore, it is to be understood that, for example, block diagrams of the present specification illustrate a conceptual aspect of an illustrative circuit for embodying a principle of the present invention. Similarly, it is to be understood that all flow charts, state transition diagrams, pseudo-codes, and the like, illustrate various processes that may be tangibly embodied in a computer-readable medium and that are executed by computers or processors regardless of whether or not the computers or the processors are clearly illustrated.

Functions of various devices including processors or functional blocks represented as concepts similar to the processors and shown in the accompanying drawings may be provided by using hardware having capability to execute appropriate software as well as dedicated hardware. When the functions are provided by the processors, they may be provided by a single dedicated processor, a single shared processor, or a plurality of individual processors, and some of them may be shared.

In addition, terms mentioned as a processor, a control, or a concept similar to the processor or the control should not be interpreted to exclusively cite hardware having capability to execute software, but should be interpreted to implicitly include digital signal processor (DSP) hardware and a read only memory (ROM), a random access memory (RAM), and a non-volatile memory for storing software without being limited thereto. The above-mentioned terms may also include well-known other hardware.

In the claims of the present specification, components represented as means for performing functions mentioned in a detailed description are intended to include all methods of performing functions including all types of software including, for example, a combination of circuit devices performing these functions, firmware/micro codes, or the like, and are coupled to appropriate circuits for executing the software so as to execute these functions. It is to be understood that since functions provided by variously mentioned means are combined with each other and are combined with a scheme demanded by the claims in the present invention defined by the claims, any means capable of providing these functions are equivalent to means recognized from the present specification.

The above-mentioned objects, features, and advantages will become more obvious from the following detailed description associated with the accompanying drawings. Therefore, those skilled in the art to which the present invention pertains may easily practice a technical idea of the present invention. Further, in describing the present invention, in the case in which it is determined that a detailed description of a well-known technology associated with the present invention may unnecessarily make the gist of the present invention unclear, it will be omitted.

Hereinafter, various exemplary embodiments of the present invention will be described in detail with reference to the accompanying drawings.

FIG. 1 is a block diagram illustrating an electronic apparatus according to an exemplary embodiment of the present invention. Referring to FIG. 1, the electronic apparatus 100 is configured to include all or some of a storing unit 110, an input unit 120, an output unit 130, a crosswalk detecting unit 140, a signal kind information determining unit 150, an operated state determining unit 155, an augmented reality providing unit 160, a control unit 170, a communicating unit 180, a sensing unit 190, and a power supply unit 195.

Here, the electronic apparatus 100 may be implemented by various apparatuses such as a smart phone, a tablet computer, a laptop computer, a personal digital assistant (PDA), a portable multimedia player (PMP), a smart glasses, a project glasses, a navigation apparatus, a black box, and the like, that may provide driving related guidance to a driver of a vehicle that is in an operated state, and may be provided in the vehicle.

Here, the operated state of the vehicle may include various states in which the vehicle is being driven by the driver, such as a stopped state of the vehicle, a driven state of the vehicle, a parked state of the vehicle, and the like.

The driving related guidance may include various kinds of guidance for assisting in driving of the driver of the vehicle, such as route guidance, lane departure guidance, front vehicle start guidance, signal lamp change guidance, front vehicle collision preventing guidance, lane change guidance, lane guidance, and the like.

Here, the route guidance may include augmented reality route guidance performing route guidance by combining various information such as a position, a direction, and the like, of a user with an image obtained by photographing the front of the vehicle that is being operated and two-dimensional (2D) or three-dimensional (3D) route guidance performing route guidance by combining various information such as a position, a direction, and the like, of a user with a 2D or 3D map data. Here, the route guidance may be interpreted as a concept including route guidance in the case in which the user walks or runs and moves as well as in the case in which the user gets in the vehicle and then drives the vehicle.

In addition, the lane departure guidance may be to guide whether or not the vehicle that is being driven has departed from a lane.

In addition, the front vehicle start guidance may be to guide whether or not a vehicle positioned in front of a vehicle that is being stopped has started.

In addition, the signal lamp change guidance may be to guide whether or not a signal lamp positioned in front of a vehicle that is being stopped has been changed. As an example, the signal lamp change guidance may be to guide that a state of the signal lamp is changed from a red lamp indicating a stop signal into a green lamp indicating a start signal.

In addition, the front vehicle collision preventing guidance may be to guide that a distance between a vehicle that is being stopped or driven and a vehicle positioned in front of the vehicle is within a predetermined distance in order to prevent collision between the above-mentioned vehicles when the distance between the vehicle that is being stopped or driven and the vehicle positioned in front of the vehicle is within the predetermined distance.

In addition, the lane change guidance may be to guide a change from a lane in which a vehicle is positioned into another lane in order to guide a route up to a destination.

In addition, the lane guidance may be to guide a lane in which a vehicle is currently positioned.

A driving related image such as a front image of the vehicle enabling provision of various kinds of guidance may be photographed by a camera mounted in the vehicle. Here, the camera may be a camera formed integrally with the electronic apparatus 100 mounted in the vehicle and photographing the front of the vehicle. In this case, the camera may be formed integrally with a smart phone, a navigation apparatus, or a black box, and the electronic apparatus 100 may receive the image photographed by the camera formed integrally therewith.

As another example, the camera may be a camera mounted in the vehicle separately from the electronic apparatus 100 and photographing the front of the vehicle. In this case, the camera may be a black box separately mounted toward the front of the vehicle, and the electronic apparatus 100 may receive a photographed image through wired/wireless communication with the separately mounted black box or receive the photographed image when a storage medium storing the photographed image of the black box therein is inserted into the electronic apparatus 100.

Hereinafter, the electronic apparatus 100 according to an exemplary embodiment of the present invention will be described in more detail on the basis of the above-mentioned content.

The storing unit 110 serves to store various data and applications required for an operation of the electronic apparatus 100 therein. Particularly, the storing unit 110 may store data required for the operation of the electronic apparatus 100, for example, an operating system (OS), a route search application, a map data, and the like, therein. In addition, the storing unit 110 may store data generated by the operation of the electronic apparatus 100, for example, a searched route data, a received image, and the like, therein.

Here, the storing unit 110 may be implemented by a detachable type of storing device such as a universal serial bus (USB) memory, or the like, as well as an embedded type of storing device such as a random access memory (RAM), a flash memory, a read only memory (ROM), an erasable programmable ROM (EPROM), an electronically erasable and programmable ROM (EEPROM), a register, a hard disk, a removable disk, a memory card, a universal subscriber identity module (USIM), or the like.

The input unit 120 serves to convert a physical input from the outside of the electronic apparatus 100 into a specific electrical signal. Here, the input unit 120 may include all or some of a user input unit 121 and a microphone unit 123.

The user input unit 121 may receive a user input such as a touch, a push operation, or the like. Here, the user input unit 121 may be implemented using at least one of a form of various buttons, a touch sensor receiving a touch input, and a proximity sensor receiving an approaching motion.

The microphone unit 123 may receive a speech of the user and a sound generated in the inside and the outside of the vehicle.

The output unit 130 is a unit outputting data of the electronic apparatus 100. Here, the output unit 130 may include all or some of a display unit 131 and an audio output unit 133.

The display unit 131 is a unit outputting data that may be visually recognized in the electronic apparatus 100. The display unit 131 may be implemented by a display unit provided on a front surface of a housing of the electronic apparatus 100. In addition, the display unit 131 may be formed integrally with the electronic apparatus 100 and output visual recognition data, or may be installed separately from the electronic apparatus 100 like a head-up display (HUD) and output visual recognition data.

The audio output unit 133 is a unit outputting data that may be auditorily recognized in the electronic apparatus 100. The audio output unit 133 may be implemented by a speaker representing a data that is to be reported to the user of the electronic apparatus 100 as a sound.

The communicating unit 180 may be provided in order for the electronic apparatus 100 to communicate with other devices. The communicating unit 180 may include all or some of a position data unit 181, a wireless Internet unit 183, a broadcasting transmitting and receiving unit 185, a mobile communicating unit 186, a short range communicating unit 187, and a wired communicating unit 189.

The position data unit 181 is a device obtaining position data through a global navigation satellite system (GNSS). The GNSS means a navigation system that may calculate a position of a receiving terminal using a radio signal received from an artificial satellite. A detailed example of the GNSS may include a global positioning system (GPS), a Galileo system, a global orbiting navigational satellite system (GLONASS), a COMPASS, an Indian regional navigational satellite system (IRNSS), a quasi-zenith satellite system (QZSS), and the like, depending on an operating subject of the GNSS. The position data unit 181 of the electronic apparatus 100 according to an exemplary embodiment of the present invention may obtain position data by receiving GNSS signals served in a zone in which the electronic apparatus 100 is used.

The wireless Internet unit 183 is a device accessing the wireless Internet to obtain or transmit data. The wireless Internet that may be accessed through the wireless Internet unit 183 may be a wireless local area network (WLAN), a wireless broadband (Wibro), a world interoperability for microwave access (Wimax), a high speed downlink packet access (HSDPA), or the like.

The broadcasting transmitting and receiving unit 185 is a device transmitting and receiving broadcasting signals through various broadcasting systems. The broadcasting system that may transmit and receive the broadcasting signals through the broadcasting transmitting and receiving unit 185 may be a digital multimedia broadcasting terrestrial (DMBT), digital multimedia broadcasting satellite (DMBS), a media forward link only (MediaFLO), a digital video broadcast handheld (DVBH), an integrated services digital broadcast terrestrial (ISDBT), or the like. The broadcasting signals transmitted and received through the broadcasting transmitting and receiving unit 185 may include a traffic data, a living data, and the like.

The mobile communicating unit 186 may access a mobile communication network to perform communication depending on various mobile communication protocols such as 3rd generation (3G), 3rd generation partnership project (3GPP), long term evolution (LTE), and the like.

The short range communicating unit 187 is a device for short range communication. The short range communicating unit 187 may perform communication through Bluetooth, radio frequency identification (RFID), infrared data association (IrDA), ultra wideband (UWB), ZigBee, near field communication (NFC), wireless-fidelity (Wi-Fi), or the like, as described above.

The wired communicating unit 189 is an interface device that may connect the electronic apparatus 100 to another device in a wired scheme. The wired communicating unit 189 may be a USB module that may perform communication through a USB port.

The communicating unit 180 may communicate with another device using at least one of the position data unit 181, the wireless Internet unit 183, the broadcasting transmitting and receiving unit 185, the mobile communicating unit 186, the short range communicating unit 187, and the wired communicating unit 189.

As an example, in the case in which the electronic apparatus 100 does not include a camera function, an image photographed by a camera for a vehicle such as a black box, or the like, may be received using at least one of the short range communicating unit 187 and the wired communicating unit 189.

As another example, in the case in which the electronic apparatus communicates with a plurality of devices, the electronic apparatus may communicate with any one of the plurality of devices through the short range communicating unit 187, and communicate with another device of the plurality of devices through the wired communicating unit 119.

The sensing unit 190 is a unit that may sense a current state of the electronic apparatus 100. The sensing unit 190 may include all or some of a motion sensing unit 191 and a light sensing unit 193.

The motion sensing unit 191 may sense motion of the electronic apparatus 100 on a 3D space. The motion sensing unit 191 may include a tri-axial terrestrial magnetism sensor and a tri-axial acceleration sensor. Motion data obtained through the motion sensing unit 191 may be combined with the position data obtained through the position data unit 181 to more accurately calculate a trajectory of the vehicle to which the electronic apparatus 100 is attached.

The light sensing unit 193 is a device measuring surrounding illuminance of the electronic apparatus 100. Brightness of the display unit 131 may be changed so as to correspond to surrounding brightness using illuminance data obtained through the light sensing unit 193.

The power supply unit 195 is a device supplying power required for an operation of the electronic apparatus 100 or an operation of another device connected to the electronic apparatus 100. The power supply unit 195 may be a device receiving power from an external power supply such as a battery embedded in the electronic apparatus 100, the vehicle, or the like. Alternatively, the power supply unit 195 may be implemented by the wired communicating unit 189 or a device receiving power in a wireless scheme depending on a scheme in which it receives the power.

The crosswalk detecting unit 140 may detect a crosswalk from an image data photographed in the camera. In detail, the crosswalk detecting unit 140 may decide an interest region including a crosswalk in the image data using a vanishing point of the photographed image. Here, the vanishing point may be decided by extracting lanes from a photographed data photographed in the camera during a period in which the vehicle is operated and extending the extracted lanes to extract an intersection therebetween. In addition, since the crosswalk is formed on a road in a lower end region of the vanishing point, the crosswalk detecting unit 140 may determine that the lower end region of the vanishing point is an interest region.

Meanwhile, the crosswalk detecting unit 140 may perform image processing on an image data on the decided interest region to determine whether or not the crosswalk is positioned in the interest region.

However, unlike the example described above, according to another exemplary embodiment of the present invention, the crosswalk detecting unit 140 may detect the crosswalk without using the image data photographed in the camera. As an example, the crosswalk detecting unit 140 may determine whether or not the vehicle is currently positioned in the crosswalk using current position information of the vehicle decided through the position data unit 181 and a crosswalk position of the map data pre-stored in the storing unit 110. Alternatively, for the purpose of more accurate decision, the crosswalk detecting unit 140 may determine whether or not the vehicle is currently positioned in the crosswalk in consideration of all of the image data photographed in the camera, the map data, and the position data.

The signal kind information determining unit 150 may determine signal kind information using an image data of a signal region portion of a signal lamp in the image data photographed in the camera. In detail, the signal kind information determining unit 150 may determine an interest region including the signal lamp in the image data using the vanishing point of the photographed image, and convert an image data of the determined interest region on the basis of a preset pixel value to generate an interest region image data.

Here, since the signal lamp is positioned in an upper region of the vanishing point, the signal kind information determining unit 150 may decide that the upper region of the decided vanishing point is the interest region.

Meanwhile, the signal kind information determining unit 150 may detect the image data of the signal region portion of the signal lamp in the image data of the decided interest region. In addition, the signal kind information determining unit 150 may determine the signal kind information on the basis of the image data of the signal region portion.

Here, the signal kind information, which is information for recognizing each of a plurality of signals that may be expressed in the signal lamp, may include stop signal information, straight movement signal information, a left turn signal, a right turn signal, and the like.

The operated state determining unit 155 may determine an operated state of the vehicle, for example, whether the vehicle is in a stopped state, in a driven state, or a parked state. In detail, the operated state determining unit 155 may determine whether or not the vehicle is in the stopped state using the image data photographed in the camera. In more detail, the operated state determining unit 155 may generate a gray image data for the image data, and sequentially compare a plurality of frames included in the generated gray image data with each other in a time sequence to determine whether or not the vehicle is in the stopped state. However, the present invention is not limited thereto. That is, the operated state determining unit 155 may determine whether or not the vehicle is in the stopped state on the basis of a signal sensed in the sensing unit 190 and motion data obtained in the position data unit 181, or may determine the operated state of the vehicle on the basis of real time speed information of the vehicle obtained using controller area network (CAN) communication of the vehicle.

Meanwhile, the electronic apparatus 100 according to an exemplary embodiment of the present invention may include the augmented reality providing unit 160 providing an augmented reality view mode. The augmented reality providing unit 160 will be described in detail with reference to FIG. 2.

Figure 2:
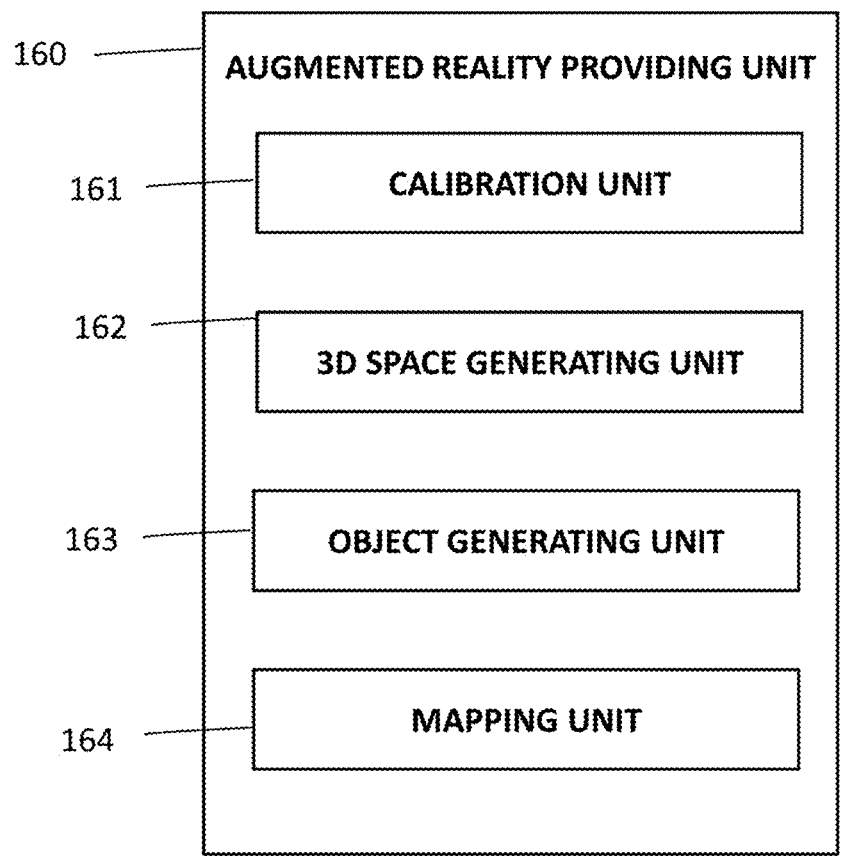
FIG. 2 is a block diagram illustrating an augmented reality providing unit according to an exemplary embodiment of the present invention in detail.

FIG. 2 is a block diagram illustrating an augmented reality providing unit 160 according to an exemplary embodiment of the present invention in detail. Referring to FIG. 2, the augmented reality providing unit 160 may include all or some of a calibration unit 161, a 3D space generating unit 162, an object generating unit 163, and a mapping unit 164.

The calibration unit 161 may perform calibration for estimating camera parameters corresponding to the camera from the photographed image photographed in the camera. Here, the camera parameters may be parameters configuring a camera matrix, which is information indicating a relationship between a real space and a photograph.

The 3D space generating unit 162 may generate a virtual 3D space on the basis of the photographed image photographed in the camera. In detail, the 3D space generating unit 162 may obtain depth information from an image photographed by the camera on the basis of the camera parameters estimated by the calibration unit 161, and generate the virtual 3D space on the basis of the obtained depth information and the photographed image.

The object generating unit 163 may generate objects for guidance, for example, a route guidance object, a lane change guidance object, a lane departure guidance object, a crosswalk object, a pedestrian guidance object, and the like, on the augmented reality. Here, the object may be implemented by a 3D object, a texture image, an art line, or the like.

The mapping unit 164 may map the object generated in the object generating unit 163 to the virtual 3D space generated in the 3D space generating unit 162.

Meanwhile, the control unit 170 controls a general operation of the electronic apparatus 100. In detail, the control unit 170 may control all or some of the storing unit 110, the input unit 120, the output unit 130, the crosswalk detecting unit 140, the signal kind information determining unit 150, the operated state determining unit 155, the augmented reality providing unit 160, the communicating unit 180, the sensing unit 190, and the power supply unit 195.

Particularly, the control unit 170 may control the object generating unit 163 to generate an object indicating the detected crosswalk when the crosswalk is detected from the image data photographed in the camera during a period in which the vehicle is operated, and may perform a control to output the generated object through the augmented reality.

As an example, in the case in which the vehicle is in the stopped state as a decision result of the operated state determining unit 155 and the crosswalk is present in front of the vehicle as a decision result of the crosswalk detecting unit 140, the control unit 170 may control the object generating unit 163 to generate a first object indicating the crosswalk. In addition, the control unit 170 may perform a control to output the generated object through the augmented reality. Here, the first object may be an object for allowing the driver to recognize that the crosswalk is present in front of the vehicle.

As another example, in the case in which the vehicle is in the stopped state as a decision result of the operated state determining unit 155, a signal is a stop signal as a decision result of the signal kind information determining unit 150, and the crosswalk is present in front of the vehicle as a decision result of the crosswalk detecting unit 140, the control unit 170 may control the object generating unit 163 to generate the first object indicating the crosswalk during a period in which the vehicle is maintained in the stopped state. In addition, the control unit 170 may perform a control to output the generated first object through the augmented reality. Here, the first object may be an object for allowing the driver to recognize that the crosswalk is present in front of the vehicle.

However, in the case in which the vehicle moves in the stopped state in the stop signal, the control unit 170 may control the object generating unit 163 to generate a second object. In addition, the control unit 170 may perform a control to output the generated second object through the augmented reality. Here, the second object may be an object for warning the driver that the crosswalk is present in front of the vehicle.

Here, the first object for allowing the driver to recognize that the crosswalk is present in front of the vehicle and the second object for warning the driver that the crosswalk is present in front of the vehicle may be distinguished from each other.

In detail, the first and second objects may be distinguished from each other by different colors. For example, the first object may be implemented by a white color similar to a color of the crosswalk of a real world and be expressed on an augmented reality screen, and the second object may be implemented by a color for allowing the driver to recognize a danger state, for example, a red color, and be expressed on the augmented reality screen.

In addition, the first and second objects may be implemented in a form in which they include an alpha channel related to transparency of colors, for example, RGBA (Red, Green, Blue, Alpha). In this case, the first and second objects may include transparent regions depending on the alpha channel. That is, the first and second objects may be implemented to include regions expressing colors and transparent regions so as to correspond to the crosswalk of the real world.

In addition, expression positions of the first and second objects may be regions in which the crosswalk is positioned on the augmented reality. For example, when the crosswalk detecting unit 140 detects the crosswalk from the image data photographed in the camera, the control unit 170 may control the mapping unit 164 to express the first and second objects at positions in the augmented reality screen corresponding to the positions at which the crosswalk is detected. According to an exemplary embodiment of the present invention described above, the object indicating the crosswalk may be expressed as if it is positioned on the crosswalk of the augmented reality screen. Therefore, guidance may be provided to the driver by a more intuitive method.

Meanwhile, according to an exemplary embodiment of the present invention, it may be determined whether or not a pedestrian is present on the crosswalk, and notification corresponding to whether or not the pedestrian is present on the crosswalk may be performed.

In detail, the control unit 170 may determine whether or not the pedestrian is present on the crosswalk using the photographed image data, and control the object generating unit 163 to generate a third object indicating whether or not the pedestrian is present. In addition, the control unit 170 may perform a control to output the generated third object through the augmented reality. Here, the third object may be an object for allowing the driver to recognize that the pedestrian is present on the crosswalk.

In addition, in the case in which a front vehicle of the vehicle starts in a state in which the pedestrian is present on the crosswalk, the control unit 170 may perform a control so as not to perform the front vehicle start guidance. That is, when the front vehicle start guidance is performed in the state in which the pedestrian is present on the crosswalk, collision between the vehicle and the pedestrian may occur. Therefore, in this case, the control unit 170 may perform a control so as not to perform the front vehicle start guidance.

In addition, in the case in which the vehicle starts in the stopped state in the state in which the pedestrian is present on the crosswalk, the control unit 170 may perform a control to perform guidance for warning the driver that the pedestrian is present on the crosswalk. That is, when the vehicle starts in the stopped state in the state in which the pedestrian is present on the crosswalk, collision between the vehicle and the pedestrian may occur. Therefore, in this case, the control unit 170 may perform a control to perform guidance indicating that the vehicle should not start.

Meanwhile, although examples in which the guidance of the crosswalk, the pedestrian, and the like, is displayed in a form of an image on the augmented reality screen have been described above, the present invention is not limited thereto. Therefore, according to another exemplary embodiment of the present invention, the control unit 170 may control the audio output unit 133 to output the guidance as an audio.

Figure 3:
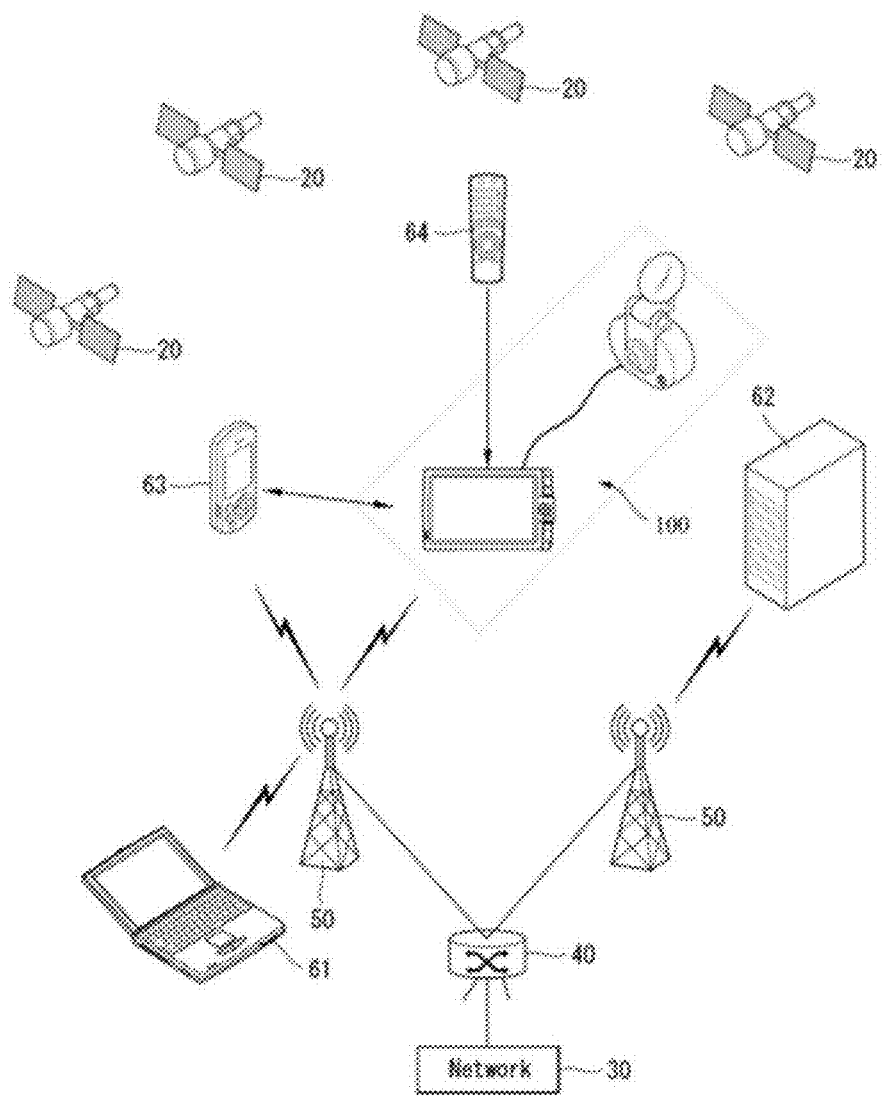
FIG. 3 is a view for describing a system network connected to an electronic apparatus according to an exemplary embodiment of the present invention.

FIG. 3 is a view for describing a system network connected to an electronic apparatus according to an exemplary embodiment of the present invention. Referring to FIG. 3, the electronic apparatus 100 according to an exemplary embodiment of the present invention may be implemented as various apparatuses provided in the vehicle, such as a navigation apparatus, a black box, a smart phone, other vehicle augmented reality interface providing apparatuses, or the like, and may be connected to various communication networks and other electronic devices 61 to 64.

In addition, the electronic apparatus 100 may interwork GPS modules with each other depending on radio signals received from artificial satellites 20 to calculate a current position and a current time.

The respective artificial satellites 20 may transmit L band frequencies of which frequency bands are different from each other. The electronic apparatus 100 may calculate the current position on the basis of a time required for the L band frequencies transmitted by the respective artificial satellites 20 to arrive at the electronic apparatus 100.

Meanwhile, the electronic apparatus 100 may wirelessly access a network 30 through an access control router (ACR) 40, a radio access station (RAS) 50, and the like, via the communicating unit 180. When the electronic apparatus 100 accesses the network 30, the electronic apparatus 100 may be indirectly connected to other electronic devices 61 and 62 accessing the network 30 to exchange data.

Meanwhile, the electronic apparatus 100 may also indirectly access the network 30 through another device 63 having a communication function. For example, in the case in which a module that may access the network 30 is not included in the electronic apparatus 100, the electronic apparatus 100 may communicate with another device 63 having the communication function through a short range communication module, or the like.

Figure 4:
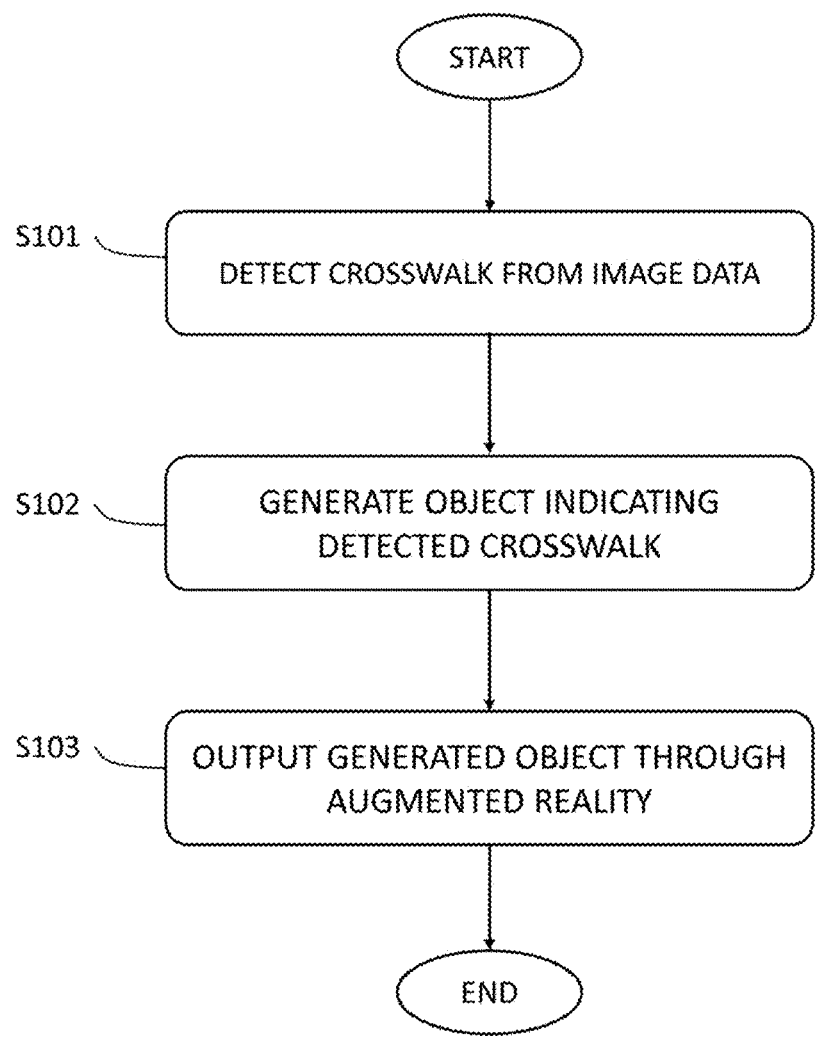
FIG. 4 is a flow chart schematically illustrating a control method of an electronic apparatus according to an exemplary embodiment of the present invention.

FIG. 4 is a flow chart schematically illustrating a control method of an electronic apparatus according to an exemplary embodiment of the present invention. Referring to FIG. 4, the electronic apparatus 100 may detect the crosswalk from the image data photographed in the camera during a period in which the vehicle is operated (S101). Here, the camera may be a camera formed integrally with the electronic apparatus 100 mounted in the vehicle and photographing the front of the vehicle or a separate black box mounted toward the front of the vehicle.

Then, the electronic apparatus 100 may generate the object indicating the detected crosswalk (S102). Here, the object may be implemented by a 3D object, a texture image, an art line, or the like.

Then, the electronic apparatus 100 may output the generated object through the augmented reality (S103). Here, the outputting (S103) may include: performing the calibration on the camera to calculate the camera parameters; generating the virtual 3D space for the photographed image of the camera on the basis of the camera parameters; and positioning the generated object on the virtual 3D space.

Hereinafter, a control method of an electronic apparatus 100 will be described in more detail with reference to FIGS. 5 to 7.

Figure 5:
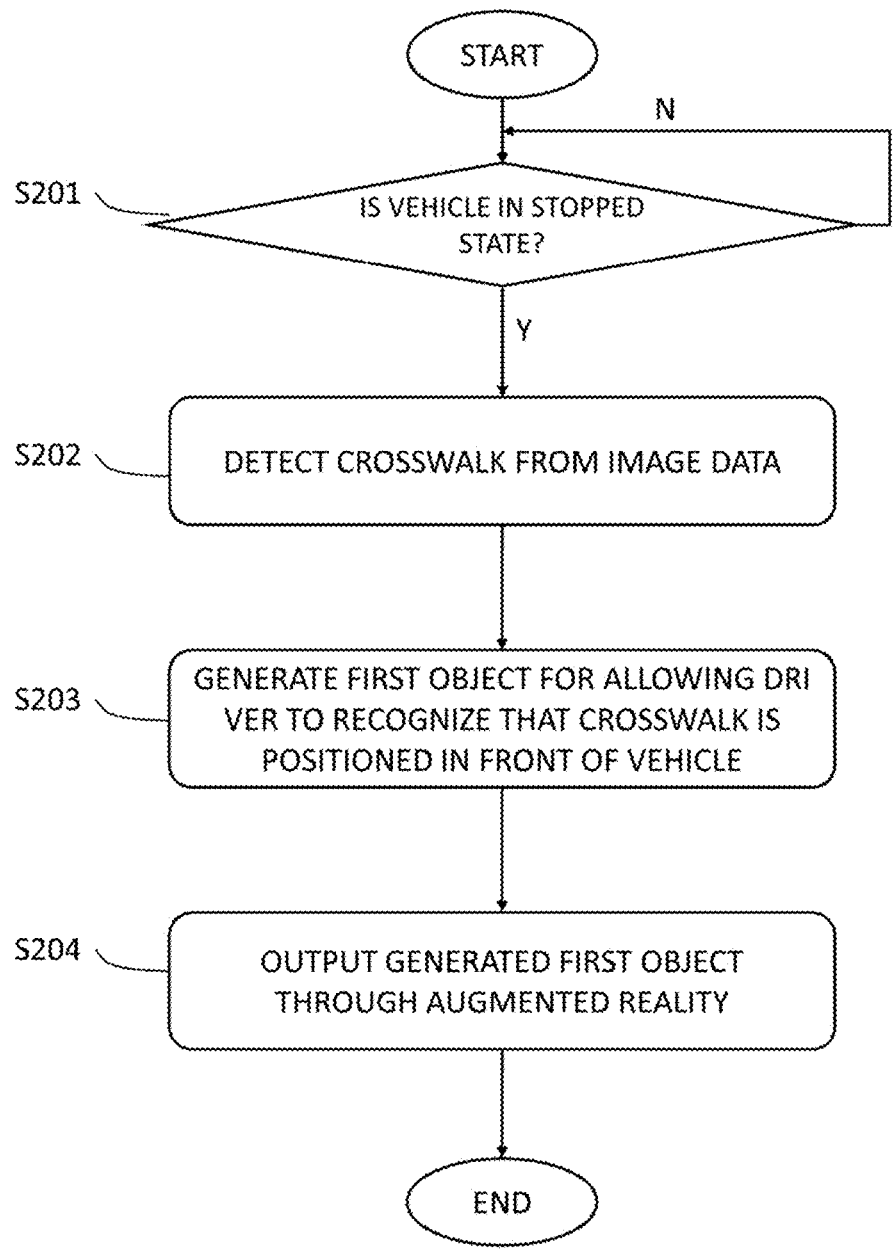
FIG. 5 is a flow chart illustrating a control method of an electronic apparatus according to an exemplary embodiment of the present invention in detail.

FIG. 5 is a flow chart illustrating a control method of an electronic apparatus according to an exemplary embodiment of the present invention in detail. Referring to FIG. 5, the electronic apparatus 100 may determine whether or not the vehicle is in the stopped state (S201). Here, the decision of whether or not the vehicle is in the stopped state may be performed using the above-mentioned operated state determining unit 155.

In the case in which the vehicle is in the stopped state, the electronic apparatus 100 may detect the crosswalk from the image data photographed in the camera during the period in which the vehicle is operated (S202). Here, the detection of the crosswalk may be performed using the above-mentioned crosswalk detecting unit 140.

When the crosswalk is detected, the electronic apparatus 100 may generate the first object for allowing the driver to recognize that the crosswalk is positioned in front of the vehicle (S203).

Then, the electronic apparatus 100 may output the generated first object through the augmented reality (S204). In this case, the control unit 170 may control the mapping unit 164 so that the generated first object is expressed adjacently to the vehicle on the augmented reality screen.

Therefore, the first object may be expressed adjacently to the front of to the vehicle on a road region of the augmented reality screen, and the driver may easily recognize that the crosswalk is present in the vicinity of the front of the vehicle.

Figure 6:
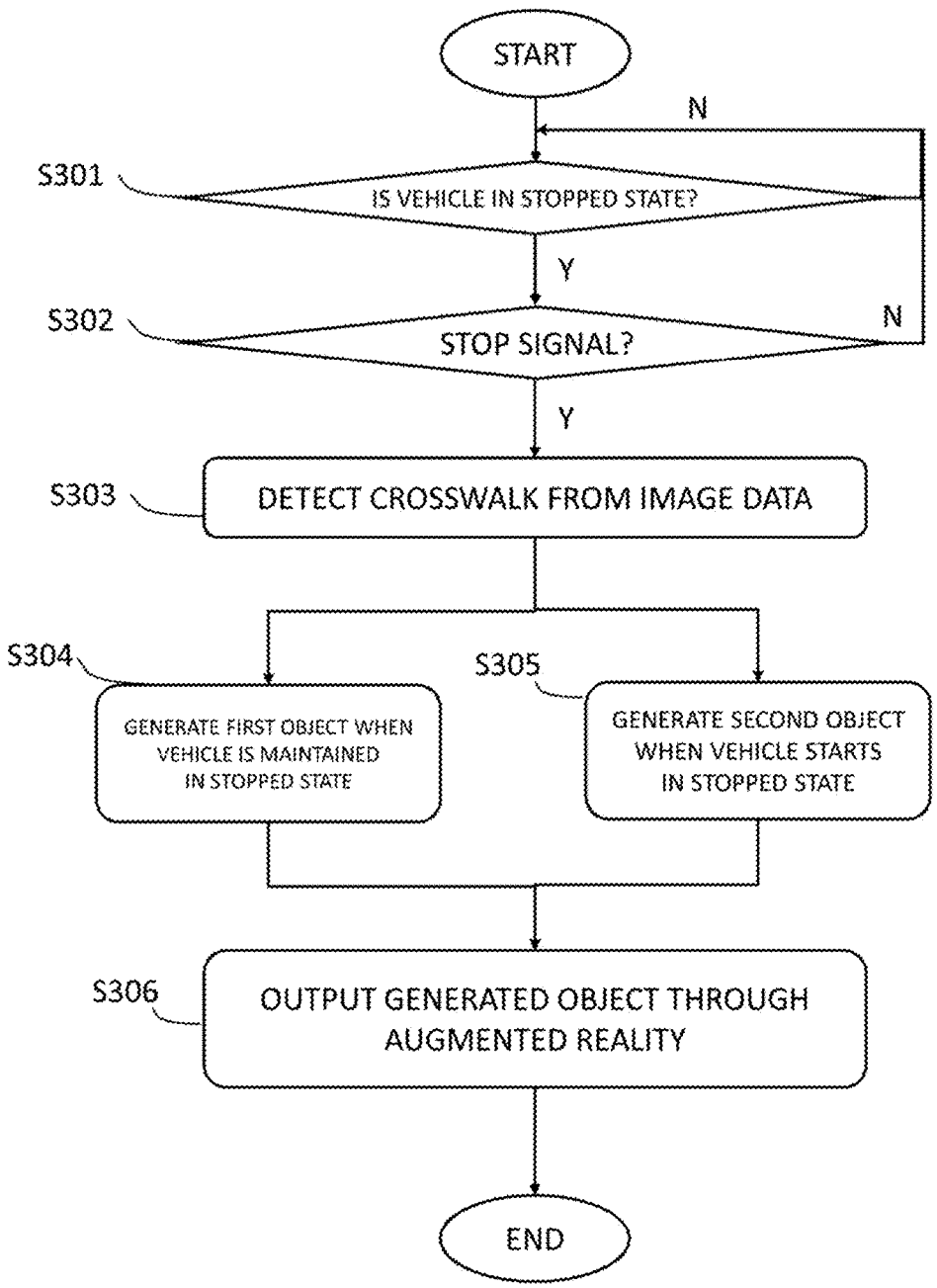
FIG. 6 is a flow chart illustrating a control method of an electronic apparatus according to another exemplary embodiment of the present invention in detail.

FIG. 6 is a flow chart illustrating a control method of an electronic apparatus according to another exemplary embodiment of the present invention in detail. Referring to FIG. 6, the electronic apparatus 100 may determine whether or not the vehicle is in the stopped state (S301). Here, the decision of whether or not the vehicle is in the stopped state may be performed using the above-mentioned operated state determining unit 155.

When it is determined that the vehicle is in the stopped state, the electronic apparatus 100 may determine the signal kind information using the image data of the signal region portion of the signal lamp in the image data (S302). Here, the decision of the signal kind information may be performed using the above-mentioned signal kind information determining unit 150.

When it is determined that the signal kind information is the stop signal, the electronic apparatus 100 may detect the crosswalk from the image data photographed in the camera during the period in which the vehicle is operated (S303). Here, the detection of the crosswalk may be performed using the above-mentioned crosswalk detecting unit 140.

Then, when the vehicle is maintained in the stopped state in a state in which the signal kind information is the stop signal, the electronic apparatus 100 may generate the first object for allowing the driver to recognize that the crosswalk is positioned in front of the vehicle (S304).

Alternatively, when the vehicle starts in the state in which the signal kind information is the stop signal, the electronic apparatus 100 may generate the second object for warning the driver that the crosswalk is positioned in front of the vehicle (S305).

Then, the electronic apparatus 100 may output the generated object through the augmented reality (S306). Here, the generated first and second objects may be expressed in forms distinguished from each other in order to provide different kinds of guidance to the driver.

Therefore, the driver may not only easily recognize that the crosswalk is present in the vicinity of the vehicle, but also easily recognize whether or not the vehicle may start.

Figure 7:
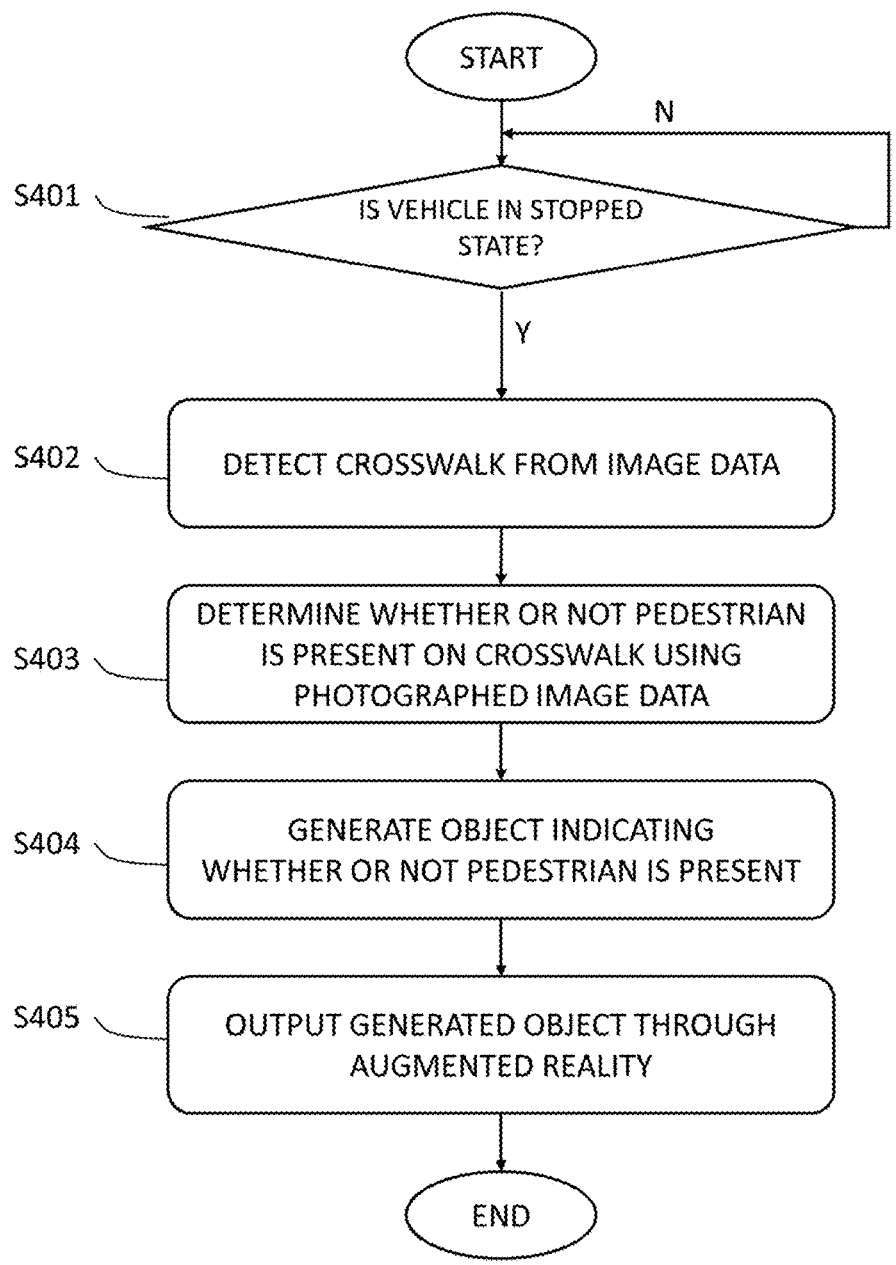
FIG. 7 is a flow chart illustrating a control method of an electronic apparatus according to still another exemplary embodiment of the present invention in detail.

FIG. 7 is a flow chart illustrating a control method of an electronic apparatus according to still another exemplary embodiment of the present invention in detail. Referring to FIG. 7, the electronic apparatus 100 may determine whether or not the vehicle is in the stopped state (S401). Here, the decision of whether or not the vehicle is in the stopped state may be performed using the above-mentioned operated state determining unit 155.

When it is determined that the vehicle is in the stopped state, the electronic apparatus 100 may detect the crosswalk from the image data photographed in the camera during the period in which the vehicle is operated (S402). Here, the detection of the crosswalk may be performed using the above-mentioned crosswalk detecting unit 140.

When the crosswalk is detected, the electronic apparatus 100 may determine whether or not the pedestrian is present on the crosswalk using the photographed image data (S403).

Then, the electronic apparatus 100 may generate the object indicating whether or not the pedestrian is present (S404).

Then, the electronic apparatus 100 may output the generated object through the augmented reality (S405). Therefore, the driver may easily recognize that the pedestrian is walking in the vicinity of the vehicle.

Meanwhile, according to the present invention, the electronic apparatus 100 may perform a control so as not to perform the front vehicle start guidance in the case in which the front vehicle of the vehicle starts in the state in which the pedestrian is present on the crosswalk.

In addition, according to the present invention, the electronic apparatus 100 may perform a control to perform the guidance for warning the driver that the pedestrian is present on the crosswalk in the case in which the vehicle starts in the stopped state in the state in which the pedestrian is present on the crosswalk.

Figure 8A:
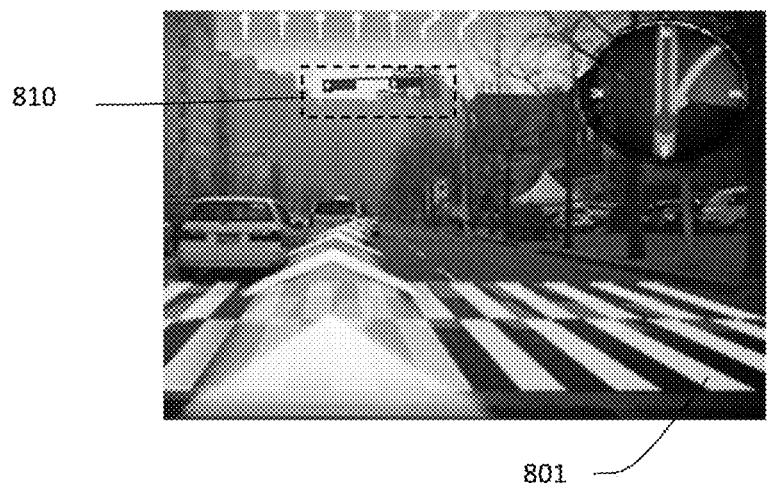
FIGS. 8A and 8B are views illustrating augmented reality screens expressing a crosswalk object according to an exemplary embodiment of the present invention.
Figure 8B:
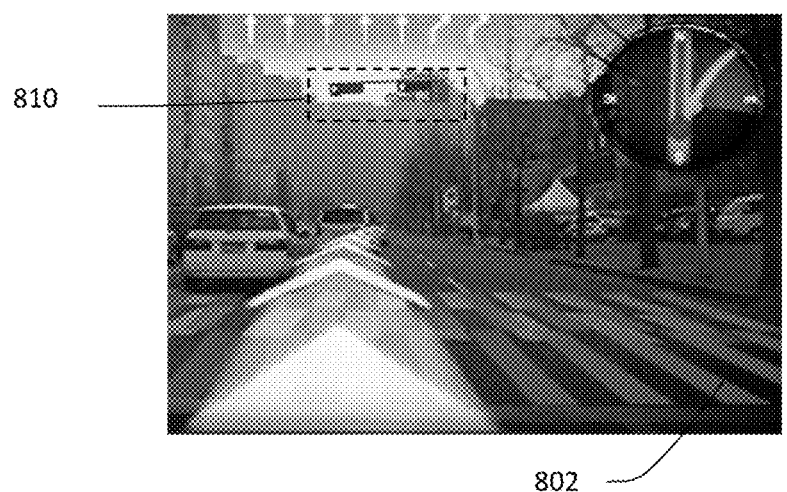

FIGS. 8A and 8B are views illustrating augmented reality screens expressing a crosswalk object according to an exemplary embodiment of the present invention. FIG. 8A is a view illustrating an augmented reality screen in the case in which the vehicle is stopped behind the crosswalk during a stop signal 810. Referring to FIG. 8A, the electronic apparatus 100 may generate a first object 801 indicating the crosswalk positioned in front of the vehicle, and output the generated first object 801 through the augmented reality. Here, the first object 801 may be expressed adjacently to the front of to the vehicle on a road region of the augmented reality screen. Therefore, the driver may easily recognize that the crosswalk is present in the vicinity of the front of the vehicle.

Meanwhile, FIG. 8B is a view illustrating an augmented reality screen in the case in which the vehicle moves in the stopped state during the stop signal 810. Referring to FIG. 8B, the electronic apparatus 100 may generate a second object 802 for warning the driver that the crosswalk is present in front of the vehicle, and output the generated second object 802 through the augmented reality. Here, the second object 802 may be expressed adjacently to the front of the vehicle on the road region of the augmented reality screen, and may be implemented by a color different from that of the first object 801 so as to be distinguished from the first object 801. Therefore, the driver may easily recognize that the vehicle should not currently start.

Meanwhile, the above-mentioned first and second objects may be implemented by a texture image and be expressed through the augmented reality. This will be described in detail with reference to FIG. 9.

Figure 9:
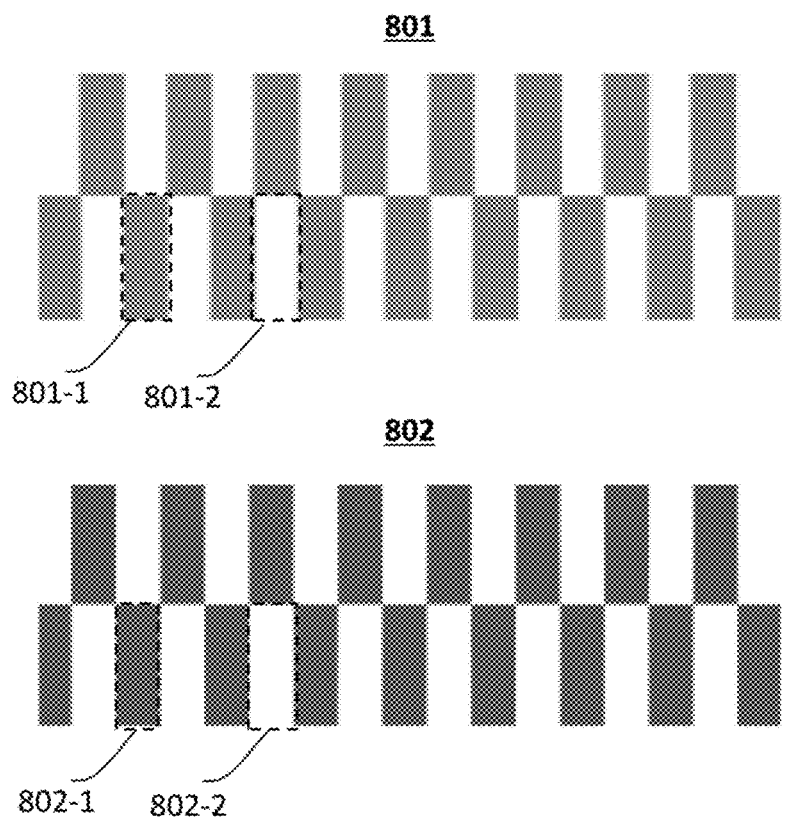
FIG. 9 is a view illustrating a texture image of the crosswalk object according to an exemplary embodiment of the present invention.

Referring to FIG. 9, the first object 801 for allowing the driver to recognize that the crosswalk is present in front of the vehicle may be implemented by a white color similar to a color of the crosswalk of the real world, and the second object 802 for warning the driver that the crosswalk is present in front of the vehicle may be implemented by a color for allowing the driver to recognize a danger state, for example, a red color and be expressed on the augmented reality screen.

Here, the first object 801 and the second object 802 may be implemented to include regions 801-1 and 802-1 expressing a color so as to correspond to the crosswalk of the real world and transparent regions 801-2 and 802-2. In this case, transparency of the transparent regions 801-2 and 802-2 may be adjusted by changing an A value, which is an alpha channel value of the RGBA (Red, Green, Blue, Alpha), as an example. In an exemplary embodiment of the present invention, the alpha channel value may have a value between 0.0 (completely transparent) and 1.0 (completely opaque). Although the RGBA value has been used as a value for displaying the color in an exemplary embodiment of the present invention, HSLA (Hue, Saturation, Lightness, Alpha), or the like, which is another color displaying unit for displaying the alpha channel value indicating transparency, may also be used.

Figure 10:
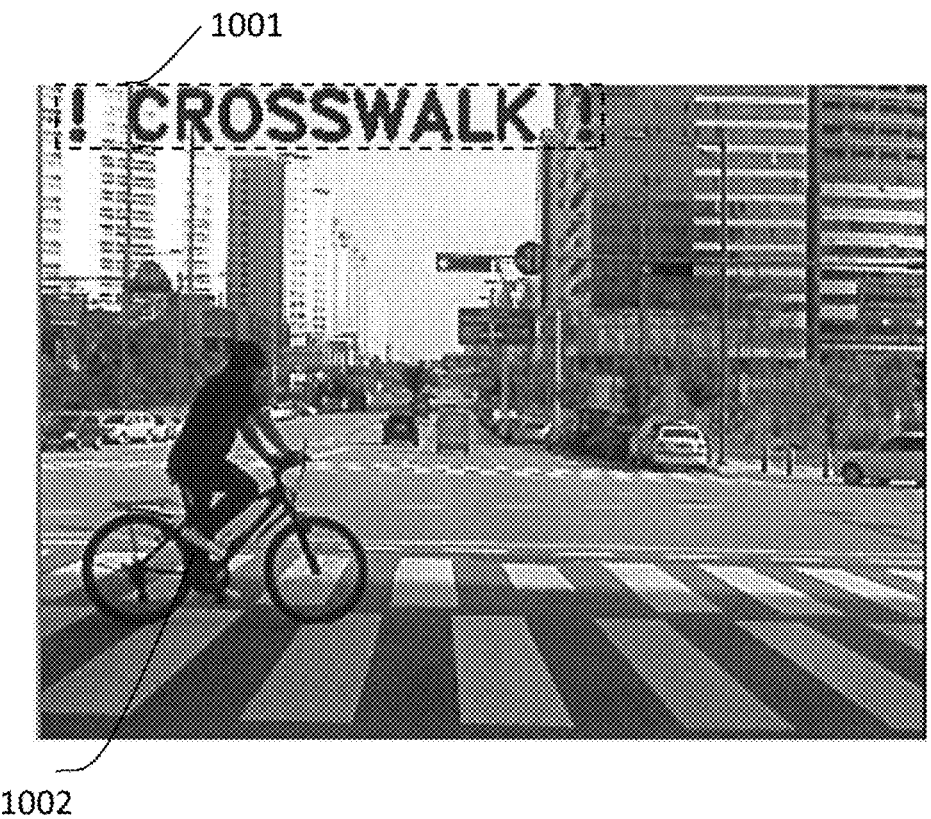
FIG. 10 is a view illustrating an augmented reality screen expressing a notification object of a pedestrian according to an exemplary embodiment of the present invention.

FIG. 10 is a view illustrating an augmented reality screen expressing a notification object of a pedestrian according to an exemplary embodiment of the present invention. Referring to FIG. 10, the electronic apparatus 100 may generate a third object 1001 for guiding that a pedestrian 1002 is present on the crosswalk in the case in which the pedestrian 1002 is present on the crosswalk, and perform a control to output the third object 1001 through the augmented reality. Therefore, the driver may easily recognize that the vehicle should not currently start while recognizing that the pedestrian is currently walking in front of the vehicle.

Figure 11:
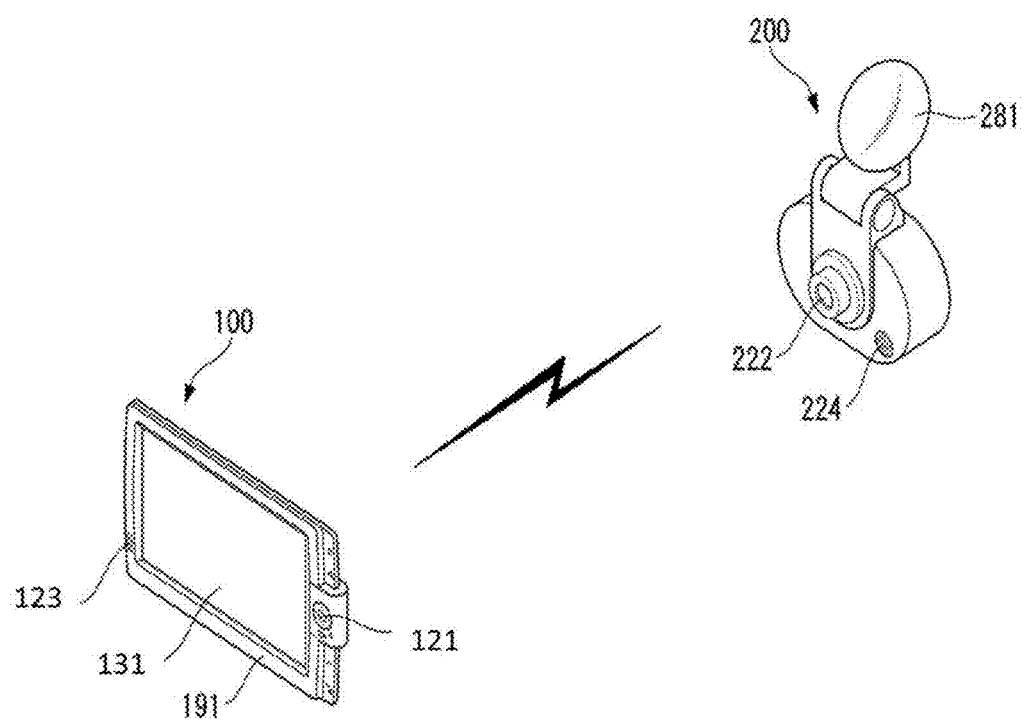
FIG. 11 is a view illustrating an implementation in the case in which a camera and an electronic apparatus according to an exemplary embodiment of the present invention are separated from each other.

FIG. 11 is a view illustrating an implementation in the case in which a navigation apparatus according to an exemplary embodiment of the present invention does not include a photographing unit. Referring to FIG. 11, a navigation apparatus 100 for a vehicle and a separately provided black box 200 for a vehicle may configure a system according to an exemplary embodiment of the present invention using a wired/wireless communication scheme.

The navigation apparatus 100 for a vehicle may include a display unit 131 provided on a front surface of a navigation housing 191, a navigation manipulation key 121, and a navigation microphone 123.

The black box 200 for a vehicle may include a black box camera 222, a black box microphone 224, and an attaching part 281.

Figure 12:
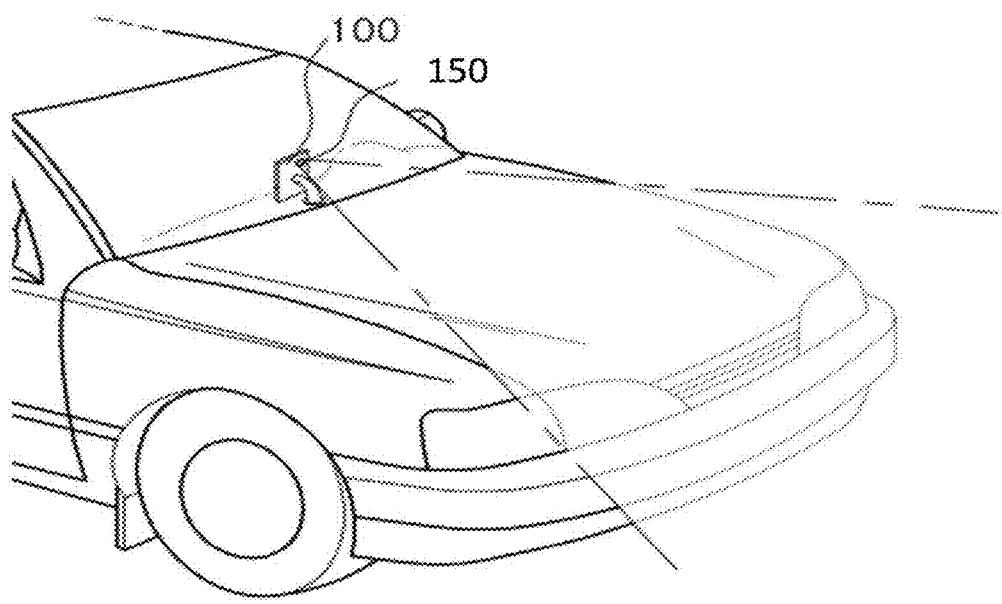
FIG. 12 is a view illustrating an implementation in the case in which a camera and an electronic apparatus according to an exemplary embodiment of the present invention are integrated with each other.

FIG. 12 is a view illustrating an implementation in the case in which a navigation apparatus according to an exemplary embodiment of the present invention includes a photographing unit. Referring to FIG. 12, in the case in which the navigation apparatus 100 includes the photographing unit 125, the user may mount the navigation apparatus 100 so that the photographing unit 125 of the navigation apparatus 100 photographs the front of the vehicle and the display unit of the navigation apparatus 100 may be recognized by the user. Therefore, a system according to an exemplary embodiment of the present invention may be implemented.

Figure 13:
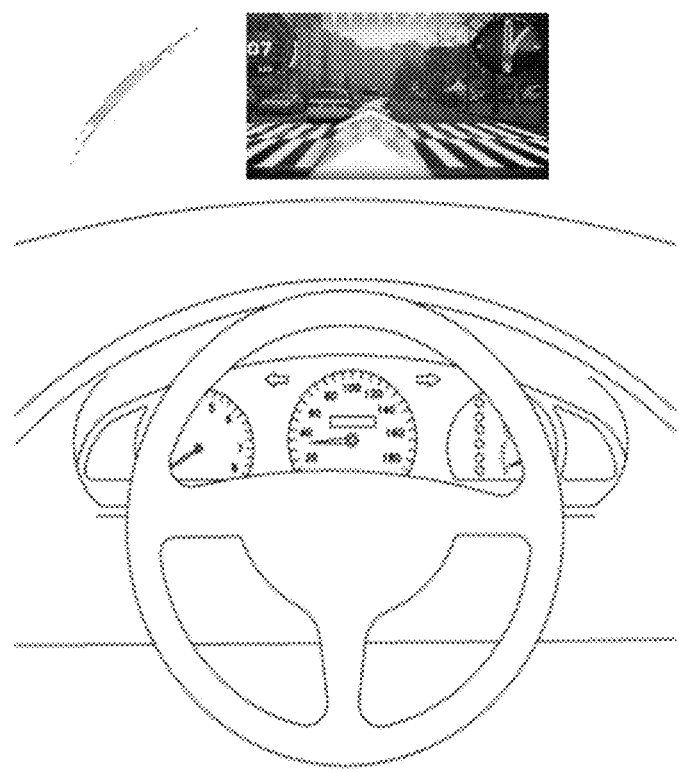
FIG. 13 is a view illustrating an implementation using a head-up display (HUD) and an electronic apparatus according to an exemplary embodiment of the present invention.

FIG. 13 is a view illustrating an implementation using a head-up display (HUD) according to an exemplary embodiment of the present invention. Referring to FIG. 13, the HUD may display an augmented reality guidance screen thereon through wired/wireless communication with other devices.

As an example, the augmented reality may be provided through the HUD using a front glass of the vehicle, an image overlay using a separate image output apparatus, or the like, and the augmented reality providing unit 160 may generate an interface image overlaid on the augmented reality image or the glass as described above, or the like. Through this, an augmented reality navigation apparatus, a vehicle infortainment system, or the like, may be implemented.

According to various exemplary embodiments of the present invention described above, the guidance information is dynamically expressed by an augmented reality method in a section in which the crosswalk is present, thereby making it possible to provide effective guidance to the driver, cause an interest of the driver, and promote safe driving and convenience of the driver for the vehicle.

In addition, according to various exemplary embodiments of the present invention, related guidance is performed depending on whether or not the pedestrian is present on the crosswalk, thereby making it possible to promote safety driving and convenience of the driver.

Meanwhile, the control methods according to various exemplary embodiments of the present invention described above may be implemented as programs and be provided to servers or devices. Therefore, the respective apparatuses may access the servers or the devices in which the programs are stored to download the programs.

In addition, the control method according to various exemplary embodiments of the present invention described above may be implemented as programs and be provided in a state in which it is stored in various non-transitory computer-readable media. The non-transitory computer-readable medium is not a medium that stores data therein for a while, such as a register, a cache, a memory, or the like, but means a medium that semi-permanently stores data therein and is readable by a device. In detail, various applications or programs described above may be stored and provided in the non-transitory computer-readable medium such as a compact disk (CD), a digital versatile disk (DVD), a hard disk, a Blu-ray disk, a universal serial bus (USB), a memory card, a read only memory (ROM), or the like.

Although exemplary embodiments of the present invention have been illustrated and described hereinabove, the present invention is not limited to the above-mentioned specific exemplary embodiments, but may be variously modified by those skilled in the art to which the present invention pertains without departing from the scope and spirit of the present invention as disclosed in the accompanying claims. These modifications should also be understood to fall within the scope of the present invention.

The invention claimed is:

1. A control method of an electronic apparatus, the method comprising:
    determining whether or not a pedestrian is present in a driving direction of a vehicle using an image data photographed in a camera;
    generating a third object indicating whether or not the pedestrian is present;
    outputting the third object through augmented reality;
    detecting a crosswalk from the image data; and
    performing a control to perform guidance for warning a driver that the pedestrian is present on the crosswalk in the case in which the vehicle starts in a state in which the pedestrian is present on the crosswalk,
    wherein if the crosswalk is detected, the determining comprises determining whether or not the pedestrian is present on the crosswalk.

2. The control method of an electronic apparatus of claim 1, further comprising performing a control so as not to perform front vehicle start guidance in the case in which a front vehicle of the vehicle starts in a state in which the pedestrian is present on the crosswalk.

3. The control method of an electronic apparatus of claim 1, wherein the outputting comprises:
    determining a mapping position of the third object on a virtual three-dimensional (3D) space for a photographed image of the camera; and
    displaying the third object through augmented reality by mapping the third object to the virtual three-dimensional space based on the mapping position.

4. The control method of an electronic apparatus of claim 1, further comprising:
    determining whether or not the vehicle is in a stopped state; and
    generating a first object for allowing a driver to recognize that the crosswalk is positioned in front of the vehicle when it is determined that the vehicle is in the stopped state.

5. The control method of an electronic apparatus of claim 1, further comprising:
    determining signal type information using an image data of a signal region portion of a signal lamp in the image data;
    generating a first object for allowing a driver to recognize that the crosswalk is positioned in front of the vehicle when the vehicle is maintained in a stopped state in a state in which the signal type information is a stop signal; and
    generating a second object for warning the driver that the crosswalk is positioned in front of the vehicle when the vehicle starts in the state in which the signal type information is the stop signal.

6. The control method of an electronic apparatus of claim 5, wherein the first and second objects are distinguished from each other by different colors.

7. The control method of an electronic apparatus of claim 5, wherein the first and second objects are implemented in a form including an alpha channel related to transparency of a color, and
    the first and second objects include transparent regions depending on the alpha channel.

8. The control method of an electronic apparatus of claim 5, wherein display positions of the first and second objects are regions in which the crosswalk is positioned on the augmented reality.

9. The control method of an electronic apparatus of claim 1, wherein the outputting further includes:
    performing calibration on the camera to calculate camera parameters;
    generating the virtual 3D space for a photographed image of the camera on the basis of the camera parameters; and
    mapping the third object on the virtual 3D space.

10. An electronic apparatus comprising:
    a display displaying a screen;
    a generator generating an object;
    a controller which determines whether or not a pedestrian is present in a driving direction of a vehicle using an image data photographed in a camera, controls the generator to generate a third object indicating whether or not the pedestrian is present, controls the display to output the third object through augmented reality, detects a crosswalk from the image data and if the crosswalk is detected, determines whether or not the pedestrian is present on the crosswalk, and performs a control to perform guidance which warns a driver that the pedestrian is present on the crosswalk in the case in which the vehicle starts in a state in which the pedestrian is present on the crosswalk.

11. The electronic apparatus of claim 10, wherein the controller performs a control which does not perform front vehicle start guidance in the case in which a front vehicle of the vehicle starts in a state in which the pedestrian is present on the crosswalk.

12. The electronic apparatus of claim 10, wherein the controller determines a mapping position of the third object on a virtual three-dimensional (3D) space for a photographed image of the camera and controls to display the third object through augmented reality by mapping the third object to the virtual three-dimensional space based on the mapping position.

13. The electronic apparatus of claim 10, wherein the controller determines whether or not the vehicle is in a stopped state, and
controls the generator to generate a first object which allows a driver to recognize that the crosswalk is positioned in front of the vehicle when it is determined that the vehicle is in the stopped state.

14. The electronic apparatus of claim 10, wherein the control unit determines signal type information using an image data of a signal region portion of a signal lamp in the image data, and
controls the object generating unit to generate a first object which allows a driver to recognize that the crosswalk is positioned in front of the vehicle when the vehicle is maintained in a stopped state in a state in which the signal type information is a stop signal and generate a second object which warns the driver that the crosswalk is positioned in front of the vehicle when the vehicle starts in the state in which the signal type information is the stop signal.

15. The electronic apparatus of claim 14, wherein the first and second objects are implemented in a form including an alpha channel related to transparency of a color, and
the first and second objects include transparent regions depending on the alpha channel.

16. A non-transitory computer readable storage medium containing instructions, that when executed by one or more processors, cause the one or more processor to perform a method, the method comprising:
determining whether or not a pedestrian is present in a driving direction of a vehicle using an image data photographed in a camera;
generating a third object indicating whether or not the pedestrian is present;
outputting the third object through augmented reality;
detecting a crosswalk from the image data; and
performing a control to perform guidance for warning a driver that the pedestrian is present on the crosswalk in the case in which the vehicle starts in a state in which the pedestrian is present on the crosswalk,
wherein if the crosswalk is detected, the determining comprises determining whether or not the pedestrian is present on the crosswalk.

* * * * *